March 8, 1960  A. M. HEITMANN  2,927,590
VALVE OPERATING MECHANISM
Filed Sept. 28, 1954
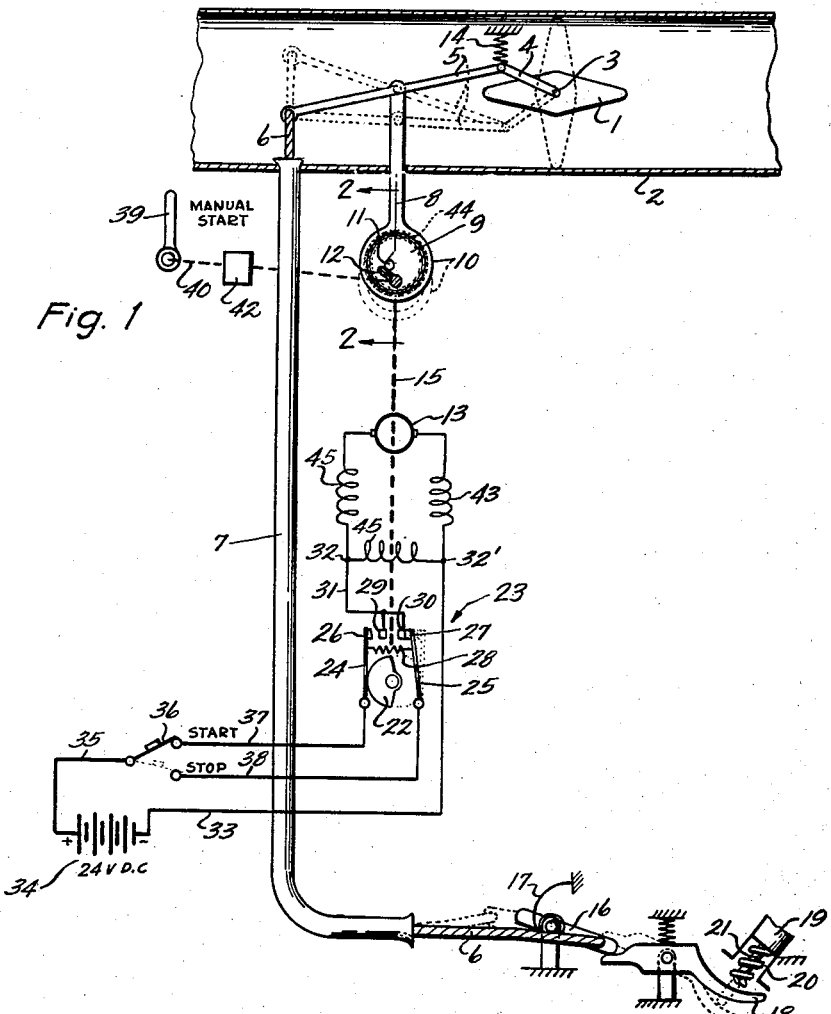
INVENTOR.
ARNOLD M. HEITMANN
BY
HIS ATTORNEY—

United States Patent Office 2,927,590
Patented Mar. 8, 1960

2,927,590

VALVE OPERATING MECHANISM

Arnold M. Heitmann, Swampscott, Mass., assignor to General Electric Company, a corporation of New York Application September 28, 1954, Serial No. 458,806

3 Claims. (Cl. 137—17)

This invention relates to an operating mechanism for a fluid valve and particularly to an improved means for operating a valve for an elastic fluid turbine. It is common practice to drive auxiliaries on an aircraft by relatively small high speed turbine units which use as a motive fluid pressurized air bleed from the compressor section of a main propulsion engine of the turboprop or turbojet type. Pressurized air thus bled from the main engine is conducted through ducting to the turbine units which may be remotely located in the aircraft. In this type of system it is common practice to have a valve at some point in the ducting between the source of motive fluid and the turbine inlet, usually at a point near the turbine inlet. The purpose of the valve is to control the starting and stopping of the turbine unit. This valve is generally positioned in the fully open position whenever the turbine is in operation and placed in the fully closed position when the unit is shut down. With this type of an arrangement it is desirable to open the valve at a relatively slow rate thereby slowly increasing the flow of motive fluid to the turbine in order that the speed control means for the turbine may have time to become fully operative before the flow of motive fluid thereto is great enough to cause overspeeding of the turbine. On the other hand, it is important that the valve be closed quickly in order to accomplish quick interruption of motive fluid to the turbine to prevent damage in the event of overspeed or other emergency. Accordingly, it is an object of the present invention to provide a control for a valve which opens the valve slowly and yet provides for quick closure thereof.

Another object of the invention is to provide control means for a valve in the motive fluid supply conduit for a fluid turbine which opens the valve automatically at a relatively slow rate with additional means for manual operation.

Still another object of the invention is to provide arrangement for accomplishing quick closure of the valve in the event of a turbine overspeed.

A further object of the invention is to provide an operating mechanism for a valve which will permit the valve to be opened slowly and yet permit quick closure of the valve in response to an operating condition of the turbine and also in response to closure of a stop switch.

Briefly, these objects are accomplished by providing an arrangement which uses a continuous but unstable linkage made stable by a mechanism sensitive to a stop signal.

The invention will be better understood from the following description taken in connection with the accompanying drawing in which Fig. 1 is a diagrammatic representation of a preferred embodiment of the invention; and Fig. 2 is an enlarged sectional view taken along the lines 2—2 of Fig. 1.

Referring to the drawing, a valve disk 1, is disposed in a conduit 2 through which pressurized fluid is supplied to a turbine (not shown). The valve disk 1 is mounted on a shaft 3 which is rotatably mounted in journals or bearings (not shown) in the conduit walls 2. Rigidly fastened to one end of the valve shaft 3 is a valve control lever 4 which in turn is pivotably fastened to a floating link 5. To the other end of the floating link 5 is fastened the end of a moveable flexible cable 6 which is encased within a rigid sheath and slidable therewith. The link 5 is pivotally connected at a point between its ends to a connecting rod 8.

A cam assembly comprises an eccentric member 9 which is mounted for rotation about an axis co-axial with the motor shaft 15. A clutch driving pin 12 is fastened to the motor shaft 15 or an extension thereof for rotation therewith. The clutch driving pin 12 is located so as to be engageable with a driven pin 11 fastened to the eccentric member 9. Thus the pins 11 and 12 provide an overriding clutch arrangement whereby torque may be transmitted from the motor shaft 15 to the eccentric member 9 in a clockwise direction only. A separate shaft 40 is connected through an overriding clutch 42 of any conventional design to the eccentric member 9 to provide manual means for control.

The eccentric member 9 is retained in an eccentric rider 10 by needle bearings therebetween which permit relative rotation therebetween. As indicated in the drawing, the eccentric rider 10 is carried by the connecting rod 8.

The valve disk 1 is biased towards the closed position as indicated by the broken lines in the drawing by a compression spring 14 which exerts a downward force on the pivot point between the valve control lever 4 and link 5.

The cable 6 is generally held in the position indicated by the solid lines in the drawing by an over center toggle 16 which in turn rests against a latch 18. A spring-loaded weight member 19 having a plunger 21 is mounted on a shaft in the turbine unit with its center of mass spaced from the center of the shaft (not shown) so that centrifugal force will move the member 19 radially outward against the bias of the spring 20 when a predetermined overspeed of the turbine unit is reached. When the weight member 19 so moves, the plunger 21 fixed thereto will strike the latch member 18 causing it to move as indicated by the broken line in the drawing. This movement of the latch 18 moves the end of the toggle 16 "over-center" with respect to its pivot so that the spring 14 acting through the link 5 and cable 6 will swing the toggle in a counterclockwise direction to the position indicated by the broken lines in the drawing. Also fastened to the motor shaft 15 is a switch cam 22 which controls an electrical switch generally indicated at 23. The switch 23 comprises two moveable contact arms 24 and 25 having mounted thereon electrical contacts 26 and 27 respectively. Electrical contacts 29 and 30 are mounted adjacent moveable contacts 26 and 27 respectively. A spring 28 fastened between the moveable contact arms 24 and 25 operates to bias the contacts 26 and 27 towards the contacts 29 and 30 respectively. As the motor shaft 15 rotates, the cam 22 bears against the moveable contact arm 24 during 180° of rotation thereby opening the contacts 26 and 29 while the contacts 27 and 30 are closed and bears against the contact arm 25 during the remaining 180° of travel so that the contacts 26 and 29 are closed and the contacts 27 and 30 are opened. The switch contacts 29 and 30 are connected electrically to a common electrical conductor 31 which is connected to a terminal 32 for the motor 13. A separate conductor 33 provides electrical continuity between a motor terminal 32' and one side of an electrical voltage source 34 which is illustrated in the drawing as a 24 volt battery. The electric motor 13 is of any common type and as shown in the drawing may be provided with compound field windings 45. The motor 13 is provided with a brake holding coil 43 which serves to release a brake (not shown) which holds the motor shaft 15 so that it cannot be rotated. When the brake is released by energizing the clutch holding coil the shaft 15 is free to rotate. Electrical conductor 35 connects the other side of the voltage source 34 to a start switch 36 which is a single pole double throw switch of any conventional design. The poles of the start switch 36 are electrically connected by conductors 37 and 38 to the moveable contact arms 24 and 25 respectively of the switch 23.

The operation of the arrangement described is as follows. Assume first that the unit is shut down and it is desired to initiate its operation. When the unit is in its normal shutdown condition, the valve disk 1 will be in the closed position as indicated by the broken lines in the drawing. The eccentric member 9 will be in the position indicated by the broken lines. Consequently the connecting rod 8 will be in its lower position as indicated by the broken lines in the drawing. The overspeed mechanism including the weight 19, latch 18, and toggle 16 will be in the position indicated by the solid lines so that the cable 6 will also be in the position indicated by the solid lines in the drawing. The switch 23 will be in the position indicated by the broken lines in the drawing so that contacts 26 and 29 are closed and contacts 27 and 30 are open.

To start the unit, the start switch 36 is turned to the start position as indicated in the drawing. In this position, electrical continuity is established between the voltage source 34 through conductor 35, switch 36, conductor 37, moveable contact arm 24, contacts 26 and 29, and conductor 31 to the terminal 32 of the motor 13. Electrical continuity between the voltage source 34 and the motor 13 thus being established, the motor 13 is energized and will begin to rotate. As the motor 13 rotates, the clutch pin 12, which is fastened to the motor shaft 15, engages the clutch pin 11 which is fastened to the eccentric member 9 forcing the eccentric rider 10 to move in an upward direction against the biasing force of the compression spring 14. The motor continues to rotate in this manner until the shaft 15 has rotated approximately 180° at which time the position of the switch 23 including the cam 22 and the cam mechanism including the driving and driven clutch pins 12 and 11 respectively assume the position indicated by the solid lines in the drawing. Under these conditions the link 5 will assume the position indicated by the solid lines in the drawing, and in doing so will have caused the valve disk 1 to be moved from the closed position as indicated by the broken lines to the open position as indicated by the solid lines. The contacts 26 and 29 being opened, electrical continuity between the voltage source 34 and the motor 13 is interrupted thereby de-energizing the motor 13 and the brake holding coil 43 so that the valve disk 1 will be held in the open position so as to permit the flow of motive fluid thereto to the turbine.

The operation on normal shutdown of the unit is as follows. When the system is in the operating condition the system elements are all positioned as indicated by the solid lines in the drawing. To initiate the shutdown cycle, the start switch 36 is moved to the stop position so that electrical continuity is established between the voltage source 34 and the motor terminal 32 through conductors 35 and 38, moveable contact arm 25, contacts 27 and 30, and conductor 31. Electrical continuity thus being established the motor 13 is energized and will begin to rotate. As the motor rotates the drive clutch pin 12 rotates in a clockwise direction. After a few degrees of rotation in this direction the clutch pin 11 is driven past a vertical line drawn through the center of rotation of the motor shaft 15 so that the linkage system becomes unstable and biasing force of spring 14 acting through link 5 and connecting rod 8 causes the eccentric member 9 to rotate to assume the position indicated by the broken lines in the drawing. As this happens it can be seen from the drawing that the valve disk 1 is snapped shut thereby effectuating quick closure of the valve. The motor 13 continues to rotate until the cam 22 opens the contacts 27 and 30 interrupting the flow of electrical current through the motor 13. The system is then ready for restarting.

Shutdown as a result of overspeed of the turbine unit is accomplished as follows. Assume the system is in its normal operating condition, the system elements being positioned as indicated by the solid lines in the drawing. Now assume that for any reason whatever the speed of the turbine exceeds a predetermined speed. Centrifugal force will cause the spring loaded weight member 19 to move radially outward causing the plunger 21 to trip the latch 18. Tripping the latch 18 moves the end of the toggle 16 over its pivot point so that the force exerted on the cable 6 by the spring 14 causes the cable 6 to move upward and the toggle 16 to rotate to the position indicated by the broken lines. As the spring 14 moves the cable 6 upward in its sheath 7, it will be seen from the drawing that the valve disk 1 moves from the fully open position to the fully closed position as indicated by the broken lines in the drawing.

Overspeed reset is accomplished by moving the start switch 36 to the stop position as indicated by the broken lines in the drawing thereby energizing the motor 13 as in the normal shutdown cycle. Assuming that the overspeed condition no longer exists, the plunger 21 will return to the position indicated by the solid lines, as will the latch 18. The motor 13 drives the eccentric member 9 through the pins 11 and 12 causing it to rotate to move the connecting rod 8 downward. As the connecting rod moves downward, the cable 6 is carried downward with the floating link 5. As the cable 6 moves downward, the spring 17 causes the toggle 16 to rotate in a clockwise direction until it rests against the latch 18. When the cam 22 rotates far enough to open the contacts 27 and 30, the motor is de-energized and the system is ready for another start.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent of the United States is:

1. A control mechanism for a fluid valve controlling the flow of motive fluid to a turbine comprising means for biasing said valve to the closed position, motor means, linkage means comprising a first link member restrained at one end thereof by releasable latching means and connected at the other end to a second link member which controls the position of said valve, cam means driven by said motor means, cam follower means connected to said first link member at a point between its ends, and trip means to release said latching means in response to an operating condition of said turbine.

2. A control mechanism for a fluid turbine comprising fluid conduit means for supplying motive fluid to said turbine, a fluid valve connected in series flow relation with said fluid conduit means for controlling the flow of motive fluid therethrough, biasing means including a spring for biasing said fluid valve towards its closed position, motor means having a rotatable output shaft for providing motive power to open said valve against the bias of said biasing means, linkage means connecting said output shaft to said valve to control the opening thereof, said linkage means including an eccentric member, an overriding clutch having a driving member connected to said output shaft and a driven member connected to said eccentric member, a floating link member pivotally connected to a second link member, said second link being adapted to control the position of said valve, a member connecting said eccentric member to said floating link member, means to energize said motor means to drive said valve through said linkage means towards its open position, means to de-energize said motor when said valve is fully open, restraining means to secure said floating link member to keep said valve fully open, means responsive to an operating condition of said turbine to release said floating link to allow said biasing means to close said valve, means to energize said motor means when said valve is in the fully open position to rotate said eccentric member until the bias of said biasing means applied to said eccentric member through said member connecting said eccentric member and said floating link creates a turning moment on said eccentric member in the same direction as that exerted by said motor means causing said driven member to override said driving member in closing said valve, and means for de-energizing said motor means before said driving member can re-engage and drive said driven member an appreciable distance.

3. In combination with a fluid turbine, fluid conduit means for supplying motive fluid to said turbine, valve means in series flow relation with said conduit means, said valve means comprising a disk mounted on a rotatable shaft which controls the opening of said valve, control means for controlling the rotation of said valve shaft comprising a floating link member fastened at one end thereof to a member which directly controls the rotation of said valve shaft, a moveable member fastened to the other end of said floating link member, latching means for preventing movement of said moveable member, a disk-shaped member rotatably and eccentrically mounted on a shaft, an eccentric rider carrying bearing means for retaining said disk-shaped member and permitting relative rotation therebetween, a connecting member rigidly connected to said eccentric rider and pivotally connected to said floating link member at a point between its ends, means for rotating said disk-shaped member comprising motor means having a rotatable output shaft, clutch means including a driving member in driving relation with said output shaft and a driven member in driving relation with said disk-shaped member, means for biasing said valve disk to the closed position, means for energizing said motor means when said valve is closed to rotate said disk-shaped member biasing means to open said valve, means for de-energizing said motor means when said valve is fully opened, means for preventing further rotation of said motor in the de-energized condition, means for releasing said latching means in response to an overspeed condition of said turbine to permit the bias of said biasing means to close said valve, means to energize said motor means when said valve is fully opened to rotate said disk-shaped member until the turning moment exerted by the biasing means on said disk-shaped member in the direction to cause said driven clutch member to override said driving clutch member to close said valve, and means for de-energizing said motor means before said driving clutch member rotates far enough to re-engage said driven clutch member and drive said valve disk towards its open position.

References Cited in the file of this patent

UNITED STATES PATENTS

| 641,117 | Kaye | Jan. 9, 1900 |
| 1,164,109 | Manly | Dec. 14, 1915 |
| 1,238,481 | Benjamin | Aug. 28, 1917 |
| 1,413,417 | Moore | Apr. 18, 1922 |
| 1,880,456 | Moorhouse | Oct. 4, 1932 |
| 2,178,559 | Cohen et al. | Nov. 7, 1939 |
| 2,257,435 | Thumim | Sept. 30, 1941 |
| 2,617,438 | Doran | Nov. 11, 1952 |
| 2,668,267 | Chapman | Feb. 2, 1954 |

FOREIGN PATENTS

| 119,399 | Austria | Oct. 10, 1930 |